(12) United States Patent
Thompson

(10) Patent No.: US 7,720,738 B2
(45) Date of Patent: May 18, 2010

(54) METHODS AND APPARATUS FOR DETERMINING A RETURN DISTRIBUTION FOR AN INVESTMENT PORTFOLIO

(76) Inventor: James R. Thompson, 142 Stoney Creek, Houston, TX (US) 77024

( * ) Notice: Subject to any disclaimer, the term of this patent is extended or adjusted under 35 U.S.C. 154(b) by 1945 days.

(21) Appl. No.: 10/336,173

(22) Filed: Jan. 3, 2003

(65) Prior Publication Data

US 2004/0133490 A1 Jul. 8, 2004

(51) Int. Cl.
*G06Q 40/00* (2006.01)
(52) U.S. Cl. .................................. 705/36 R; 705/35
(58) Field of Classification Search .................. 705/35, 705/36 R
See application file for complete search history.

(56) References Cited

U.S. PATENT DOCUMENTS

| | | | | |
|---|---|---|---|---|
| 5,918,217 A * | 6/1999 | Maggioncalda et al. | ... | 705/36 R |
| 6,012,044 A * | 1/2000 | Maggioncalda et al. | ... | 705/36 R |
| 6,021,397 A * | 2/2000 | Jones et al. | ............... | 705/36 R |
| 6,208,738 B1 * | 3/2001 | Goldenfeld et al. | ......... | 380/287 |
| 6,513,018 B1 * | 1/2003 | Culhane | ...................... | 705/35 |
| 7,120,601 B2 * | 10/2006 | Chen et al. | ................ | 705/36 R |
| 7,321,871 B2 * | 1/2008 | Scott et al. | ................ | 705/36 R |
| 7,552,076 B1 * | 6/2009 | Uenohara et al. | ......... | 705/36 R |
| 2002/0138386 A1 * | 9/2002 | Maggioncalda et al. | ....... | 705/36 |
| 2003/0055765 A1 * | 3/2003 | Bernhardt | .................... | 705/36 |
| 2003/0101122 A1 * | 5/2003 | Merkoulovitch et al. | ...... | 705/36 |
| 2003/0130899 A1 * | 7/2003 | Ferguson et al. | ............. | 705/26 |
| 2004/0054612 A1 * | 3/2004 | Ocampo | ...................... | 705/36 |
| 2004/0117286 A1 * | 6/2004 | Charnley, Jr. | ................ | 705/36 |
| 2005/0187851 A1 * | 8/2005 | Sant | ............................ | 705/36 |
| 2007/0198387 A1 * | 8/2007 | Uenohara et al. | ......... | 705/36 R |

OTHER PUBLICATIONS

U.S. Research Office; "Some Topics in Computer Assisted Modeling, Simulation, and Data Analysis," Nov. 30, 2001, pp. 1-7.*
Thomas, James, et al. "Models for Investors in Real World Markets," 2002, John Wiley & Sons, pp. 239-240.*
U.S. Army Conferences on Applied Statistics, "Program in Brief," Oct. 2001, p. 2 of 3. http://www.armyconference.org/ACAS00-02/ACAS01WebPage/program.htm.*
U.S. Army Conference on Applied Statistics, "Bootstrapping a Stochastic Process: Time-Indexed Risk Profile Analysis of an Index Fund," Oct. 2001, pp. 50-59. http://www.armyconference.org/ACAS00-02/Master01.pdf.*
Thompson, James R., et al., "*Models for Investors in Real World Markets*", John Wiley and Sons, Nov. 2002, pp. 62-69.
Thompson, James R., et al., "*Models for Investors in Real World Markets*", John Wiley and Sons, Nov. 2002, pp. 361-364.
Sharpe, William F., "Portfolio Theory and Capital Markets," 2000, pp. 102-103, McGraw-Hill, USA.
Thompson, James R., et al., "Nobels for Nonsense," Journal of Post Keynesian Economics, Fall 2006, pp. 3-18, vol. 29, No. 1, M.E. Sharpe, Inc.

* cited by examiner

*Primary Examiner*—Jagdish N Patel
*Assistant Examiner*—Kenneth Bartley

(57) ABSTRACT

A portfolio analysis technique determines a distribution of possible values of a portfolio at a future time and percentiles or cumulative probabilities for each possible future value. The future return distribution may be determined in accordance with a variety of techniques. In accordance with some embodiments, the distribution is determined using a model of future returns. In accordance with other embodiments, the distribution may be determined by resampling past returns of the portfolio. In general, the techniques described herein may be implemented on an electronic system, such as a computer that executes software.

33 Claims, 13 Drawing Sheets

```
┌─────────────────────────────────────────────────────────────────┐ ／ 220
│  Enter the initial security value(s)$S(0)$ and select a future time$T$.  │
└─────────────────────────────────────────────────────────────────┘
                                  ▼                        ／ 222
┌─────────────────────────────────────────────────────────────────┐
│  Estimate the security's growth (e.g. $\hat{\mu}$) and volatility (e.g., $\hat{\sigma}$)  │
└─────────────────────────────────────────────────────────────────┘
                                  ▼                              224
┌─────────────────────────────────────────────────────────────────┐
│                                                                 │
└─────────────────────────────────────────────────────────────────┘
```

```
                                                                  230
┌─────────────────────────────────────────────────────────────────┐
│  For a given probability, compute the standard normal variate $Z$ │
└─────────────────────────────────────────────────────────────────┘
                                  ▼                        ／ 232
┌─────────────────────────────────────────────────────────────────┐
│  Compute $S(T)$ using  $S(T) = S(0)e^{[(\mu-\frac{1}{2}\sigma^2)T + \sigma\sqrt{T}z]}$  │
└─────────────────────────────────────────────────────────────────┘
         ◄──── Repeat for various probabilities ────▼
```

METHODS AND APPARATUS FOR DETERMINING A RETURN DISTRIBUTION FOR AN INVESTMENT PORTFOLIO

BACKGROUND

1. Field of the Invention

The present invention generally relates to portfolio analysis. More particularly, the invention relates to forecasting a distribution of possible future values for an investment portfolio.

2. Background Information

An investor has numerous investment options. Examples of investment options include stocks, bonds, commodities, etc. In general, investors desire for their investments to achieve returns that are acceptable to the investors. How best to invest one's money to achieve desired results is an age-old dilemma.

To a certain extent, modern investment theories are generally based on the work of Nobel Laureate Harry Markowitz. Markowitz developed and published a solution to the following problem: Given a set of n stocks and a capital to be invested of C, what is the allocation of capital that maximizes the expected return, at a future time t, of the portfolio for an acceptable volatility of the total portfolio?

Quantifying "volatility" has been defined in different ways. One definition of volatility is the square root of the variance of the value of a portfolio (typically designated by the Greek letter sigma, $\sigma$). A problem with using $\sigma$ as a surrogate for volatility is that many investors have no particular "feel" for what $\sigma$ means. Consequently, many investors have no idea as to what value of $\sigma$ is appropriate for them. In short, even if the theory offered by Markowitz is sound, it may be difficult to implement in a practical way. A different approach to portfolio analysis is needed that addresses this issue.

BRIEF SUMMARY OF THE PREFERRED EMBODIMENTS OF THE INVENTION

One or more of the problems noted above may be solved by a portfolio analysis technique that computes, estimates, or otherwise determines a distribution of possible values of a portfolio at a future time and percentiles (cumulative probabilities) for each possible future value. The future return distribution may then be determined in accordance with a variety of techniques. In accordance with some embodiments, the distribution is determined using a model of future returns. In accordance with other embodiments, the distribution may be determined by resampling past returns of the portfolio and extrapolating these into the future. The techniques described herein may be implemented on an electronic system, such as a computer that executes appropriate software.

BRIEF DESCRIPTION OF THE DRAWINGS

For a detailed description of the preferred embodiments of the invention, reference will now be made to the accompanying drawings in which:

FIG. 4 shows a preferred process for determining the estimated return distribution based on historical data as shown in FIG. 3 including computing a security's returns using a model of returns;

FIG. 5 shows a process of forecasting a security's returns as in FIG. 4 in accordance with a preferred embodiment of the invention;

NOTATION AND NOMENCLATURE

Certain terms are used throughout the following description and claims to refer to particular system components. As one skilled in the art will appreciate, various organizations and individuals may refer to a component by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. The term "portfolio" refers to one or more securities in a group. The term "security" refers to any type of investment such as stocks, bonds, commodities, etc. Unless otherwise stated below, the verb "determines" includes computing, calculating, estimating, or in any other way obtaining a desired object or result. As used herein, the word "formula" may include one formula or more than one formula.

DETAILED DESCRIPTION OF THE PREFERRED EMBODIMENTS

The following discussion is directed to various embodiments of the invention. Although one or more of these embodiments may be preferred, the embodiments disclosed should not be interpreted or otherwise used as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
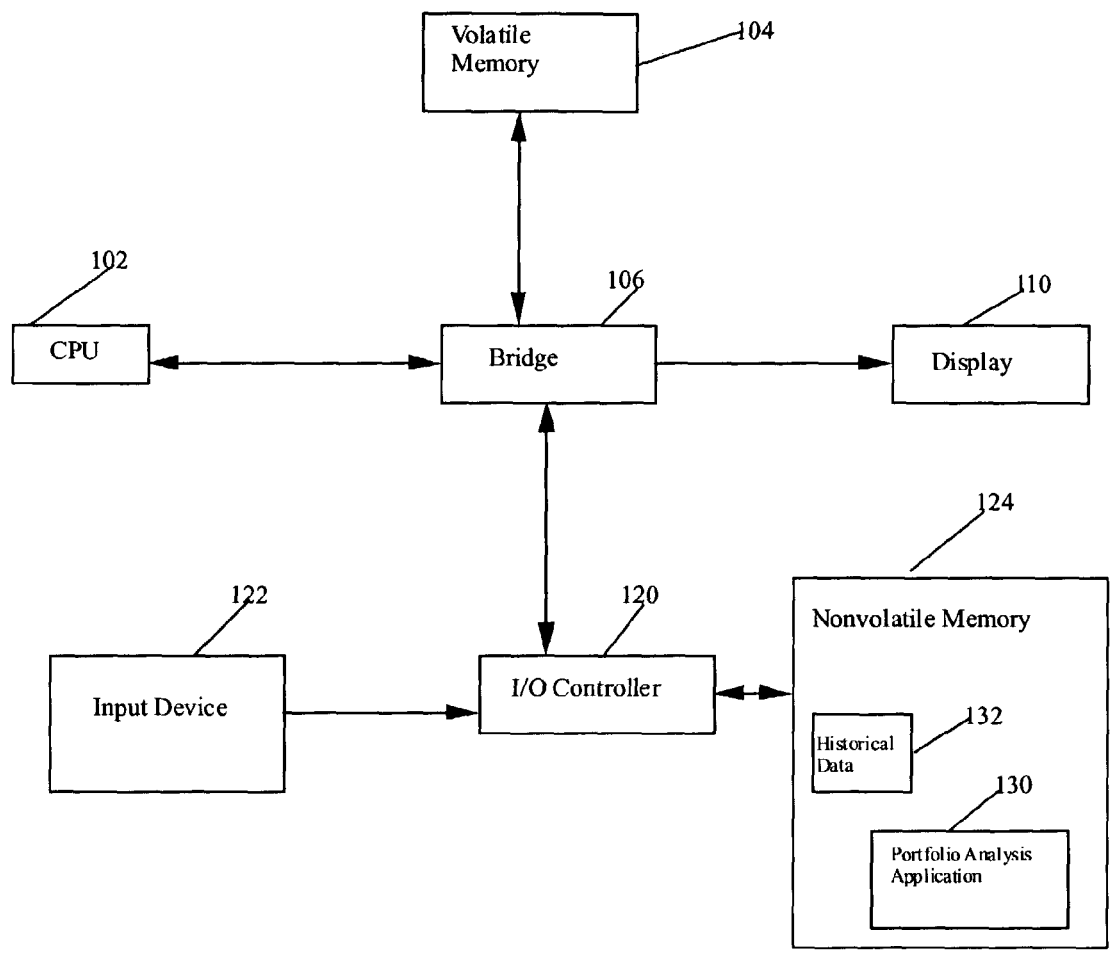
FIG. 1 shows a block diagram of an electronic system usable in accordance with the preferred embodiments of the invention.

FIG. 1 illustrates a preferred embodiment of an electronic system 100 capable of providing some or all of the functionality described below. The system 100 preferably comprises a computer system and, as such, includes at least one central processing unit ("CPU") 102, bridge device 106, volatile memory 104, a display 110, input/output ("I/O") controller 120, an input device 122 and non-volatile memory 124. FIG. 1 shows an exemplary configuration of the components comprising computer system 100, and the system 100 may comprise numerous other configurations. As shown, the CPU 102, memory 104, and display 110 couple to the bridge device 106. Images (e.g., graphics, text) are provided to display 110 for presentation to a user of the system 100. Via the input device 122 (which may comprise a keyboard, mouse, trackball, etc.), a user can interact with the computer system 100. Input signals from the input device 122 (e.g., keyboard, mouse, etc.) may be provided to the CPU 102 via the I/O controller 120.

The non-volatile memory 124 may comprise a hard disk drive or other type of storage medium. The non-volatile memory 124 may include one or more applications that are executable by the CPU 102. At least one such application is a portfolio analysis application 130, which implements some, or all, of the functionality described below. The application thus comprises instructions that are retained in a storage medium and are executed by the computer. Any of the values described below which are provided by a user of the portfolio analysis application 130 to the computer system 100 may be input via the input device. The non-volatile memory 124 may also include a "historical data" file 132, which will be explained below.

Although the computer system 100 in FIG. 1 includes a display 110 and an input device 122, other embodiments of an electronic system include computers without displays and input devices. For example, the electronic system may comprise a "headless" server computer which may include one or more CPUs, volatile and non-volatile memory, and other logic, but may not include input and/or output devices (display, keyboard, etc.). Such a server can be manufactured as a module that mounts in a support structure such as a rack. The rack may have capacity to accommodate a plurality of servers. One or more servers in the rack may be capable of performing the processes described below. A console including an input device (e.g., keyboard) and an output device (e.g., a display) may be operatively coupled to any of the servers in the rack to program, configure, or otherwise operate the server as described below, as well as to provide a display for any results.

Figure 2:
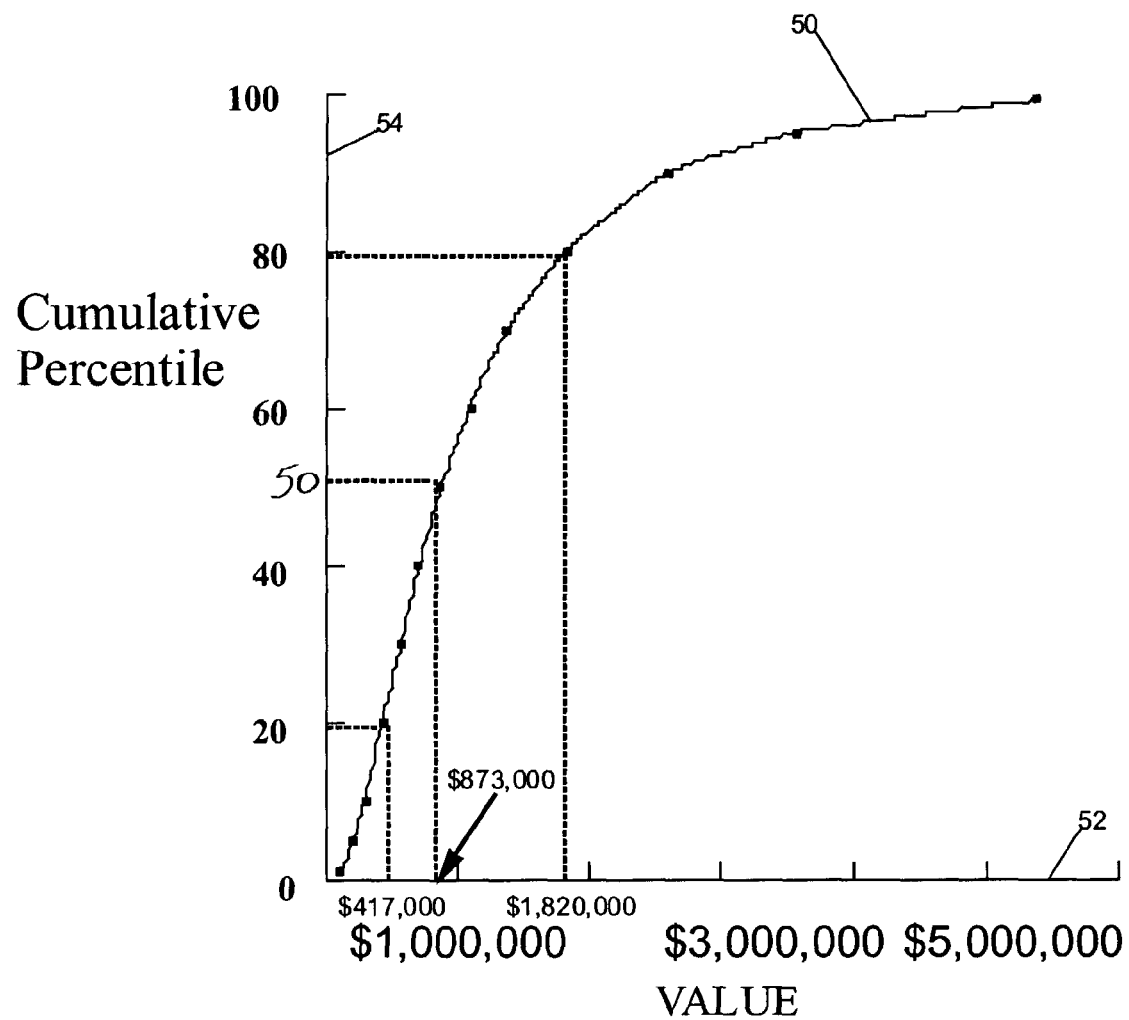
FIG. 2 shows an exemplary return distribution in accordance with a preferred embodiment of the invention.

In accordance with the preferred embodiments of the invention, the CPU 102, executing portfolio analysis application 130 determines a distribution of possible returns for a portfolio at a future time. FIG. 2 shows an example of an estimated return distribution 50 for a particular portfolio at a future time. The time associated with the exemplary return distribution 50 is 20 years into the future. The return distribution 50 shows various possible portfolio values along the x-axis 52 and corresponding cumulative percentiles along the y-axis 54. In the example of FIG. 2, the return distribution 50 pertains to a starting amount of capital of $100,000. The return distribution 50 may be shown on the display 110 or stored in a file in the non-volatile memory 124 for subsequent access.

The 20, 50 and 80 percentile values along the y-axis 54 will now be described to aid in understanding the meaning of the estimated return distribution. The 20 percentile point corresponds to a portfolio value on the x-axis 52 of $417,000. This means that a portfolio value of $417,000 may be obtainable 20 years into the future, but that (relatively low) value (or a lower value) is likely to only occur 20% of the time. Alternatively stated, the 20 percentile point means that the chances are 80% that the portfolio will be worth at least $417,000. The 50 percentile point corresponds to a portfolio value of $873,000 meaning that 50% of the time, the portfolio depicted in FIG. 2 will result in a value of at least $873,000 from an initial $100,000 20 years into in the future. Similarly, the 80 percentile point, which corresponds to a portfolio value of $1.82M indicates that such a relatively high portfolio value of $1.82M or more 20 years into the future may be achievable only 20% of the time. Thus, the return distribution reflects the probability of achieving a spectrum of results at a particular time in the future.

Figure 3:
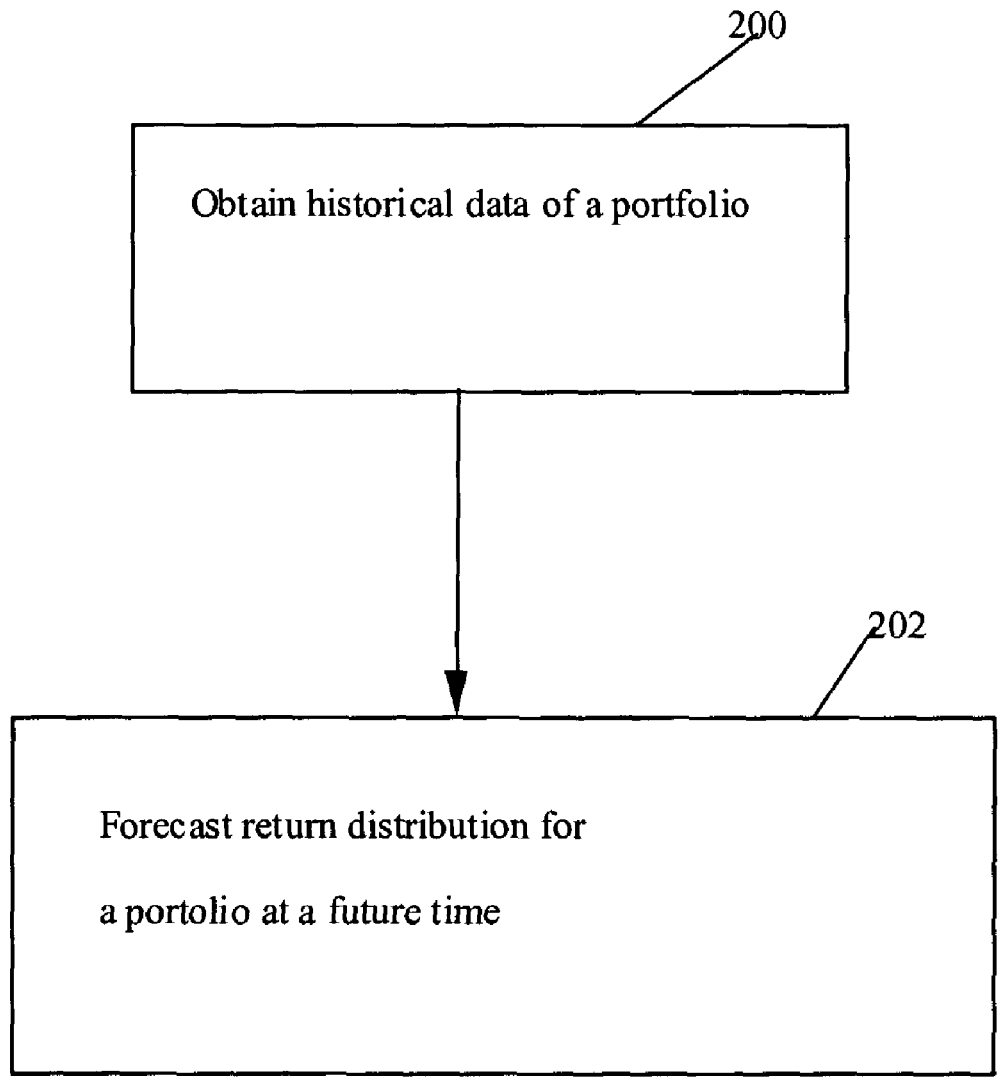
FIG. 3 shows a preferred process for obtaining a distribution that is indicative of a portfolio's estimated returns at a future time including determining a return distribution based on historical data.

Referring now to FIG. 3, a method is shown, in accordance with a preferred embodiment of the invention, that may be performed by the computer system's portfolio analysis application 130. As shown, the preferred method includes obtaining historical data pertaining to a portfolio (block 200). In block 202, the return distribution 50 for the portfolio is determined at a future time as described below.

The historical data obtained in block 200 may include the historical return (generally price change plus dividends paid) of a single investment, in the case in which the portfolio contains only a single security, or the historical prices of multiple securities when the portfolio comprises multiple securities. The historical prices include the price(s) of the investment(s) on a periodic basis over a past period of time. For example, the historical data may include monthly stock prices over the last 75 years or yearly prices for the last 75 years. In general, the historical data reflects the change in price of the investment(s) over a previous period of time. Historical data may be obtained in accordance with any suitable technique such as from on-line databases, newspapers, etc. The historical data preferably is stored in a file 132 located on the non-volatile memory 124 (FIG. 1). The act of obtaining the historical data may include retrieving the data from a suitable source and loading such data into file 132. Alternatively, the act of obtaining the historical data may include retrieving the data from file 132.

FIG. 4 shows an exemplary embodiment for determining a return distribution 50 at a future time T (block 202 in FIG. 3) for a portfolio having a single security. As shown in FIG. 4, determining a return distribution may comprise blocks 220-224. In block 220, the initial value of the security at issue is obtained. The initial value may be "today's" trading price for the security. The initial security value is represented as "S(0)." The "0" means that the security price is given at time 0 (i.e., current price). Block 220 may also include selecting a future time for which the portfolio analysis application is to compute a return distribution such as distribution 50. The future time is represented as "T" and preferably is measured relative to time 0 at which S(0) is obtained.

Block 222 includes estimating the security's growth and volatility. A variety of measures of growth and volatility are acceptable. One suitable representation of volatility includes an estimate of volatility that is commonly referred to as "$\hat{\sigma}$" and is given by the following formula:

$$\hat{\sigma} = \sqrt{\frac{S_R^2}{\Delta t}} \quad (1)$$

Where $S_R^2$ is represented by $$\frac{1}{N-1}\sum_{i=1}^{N}(R(i)-\overline{R})^2$$

and Δt represents the time interval between successive security prices in the historical data. A suitable representation of growth includes an estimate of growth that is commonly referred to as "$\hat{\mu}$" and is given by the following formula:

$$\hat{\mu} = \frac{\overline{R}}{\Delta t} + \frac{\hat{\sigma}^2}{2} \quad (2)$$

where $\overline{R}$ is given by $$\overline{R} = \frac{1}{N}\sum_{i=1}^{N}R(i).$$

In the preceding formulae N represents the number of time intervals represented by the historical data and R(i) represents the period-to-period growth of the security. One suitable representation of R(i) includes $$R(i) = \log\left[\frac{S(t_i)}{S(t_{i-1})}\right].$$

In block 224, the portfolio analysis application 130 preferably computes the security's return distribution at future time T using a suitable model of returns. A variety of suitable return models may be used for block 224. FIG. 5 illustrates one exemplary technique for implementing block 224. A value from a suitable random probability distribution is computed in block 230. Although a variety of random probability functions may be used in this regard, the "Z" probability distribution preferably is used. The density function of Z may be given by $$f(z) = \frac{1}{\sqrt{2\pi}}e^{\left(\frac{-z^2}{2}\right)}.$$

In general, Z comprises a normal (i.e., Gaussian) random variable whose mean is equal to zero and variance is equal to one. Software routines are widely known that can be implemented on computer system 100 to compute values of the Z random probability function. By way of example, Table I below lists various values of the Z distribution function for various probabilities.

TABLE I

| VALUES OF Z | |
|---|---|
| Z | PROBABILITY |
| 2.3263 | .01 |
| 1.6449 | .05 |
| 1.2816 | .10 |
| 1.0364 | .15 |
| .8416 | .20 |
| .6745 | .25 |
| .5244 | .30 |
| .2533 | .40 |
| 0 | .50 |

In block 232, an equation that suitably models future security returns is evaluated using the value of Z computed in block 230. One suitable model of returns comprises the Geometric Brownian Motion model which, in the context of security analysis, is given by:

$$S(T) = S(0)e^{[(\mu - 1/2\sigma^2)T + \sigma\sqrt{T}z]} \quad (3)$$

where the estimates of growth ("$\hat{\mu}$") and volatility ("$\hat{\sigma}$") are used in equation (3) above in place of μ and σ, respectively. Other estimates or proxies of μ and σ may also be used. Once solved, equation (3) provides a value of S(T) which indicates the value of the security at future time T for the value of Z computed in 230. The value of Z used in equation (3) corresponds to a particular probability and thus the computed value of S(T) is similarly associated with a probability. Blocks 230 and 232 may be performed once or repeated with different values of Z (and thus different probabilities). Using multiple Z values to compute multiple S(T) values results in a return distribution 50 for the security at future time T.

Figure 6:
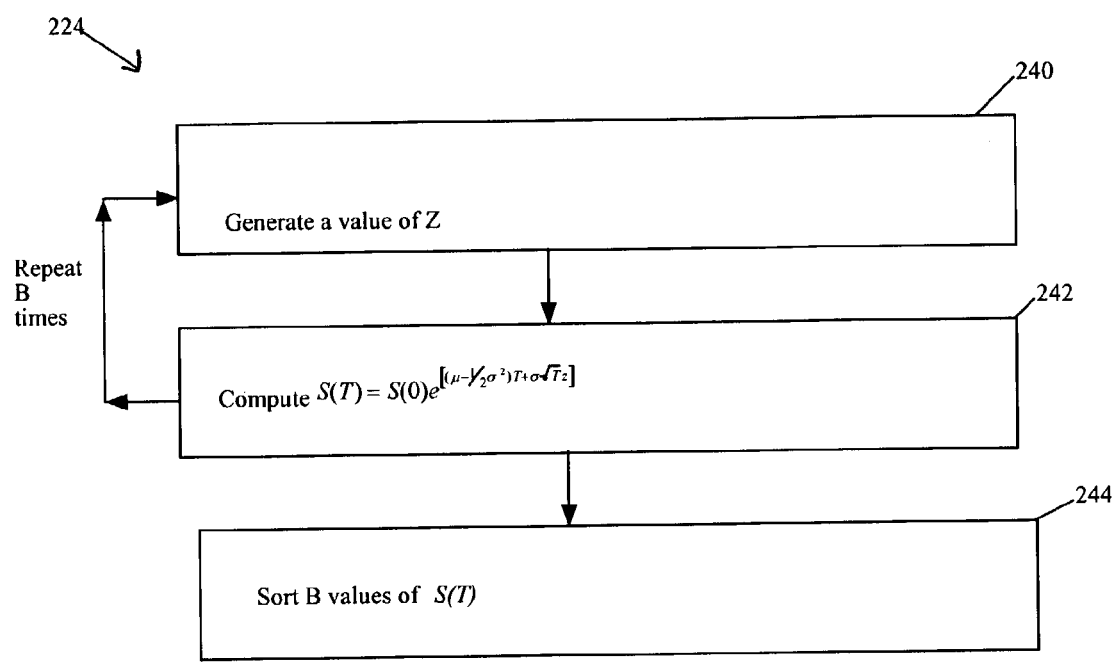
FIG. 6 shows another process of forecasting a security's returns as in FIG. 4 in accordance with a preferred embodiment of the invention.

Another embodiment for determining a security return distribution 50 is shown in FIG. 6 which includes blocks 240-244. In block 240, using any one of the many standard computer routines for generating simulated observations from a normal distribution, a value of Z is generated from a normal (Gaussian) distribution with mean zero and variance one. In block 242, S(T) is computed using the value of Z computed in 240. Blocks 240 and 242 preferably are repeated B times (e.g., 10,000 times). The B values of S(T) are then sorted (block 244). Once sorted, the B values of S(T) represent the return distribution for the security. For example and also referring to FIG. 2, if B is 10,000, the value of S(T) that is 1,000 from the smallest represents the lower 10 percentile value. Further, the value of S(T) that is at the mid-point (i.e., 5,000 from the lowest/highest) represents the median point (the 50 percentile point).

Figure 7:
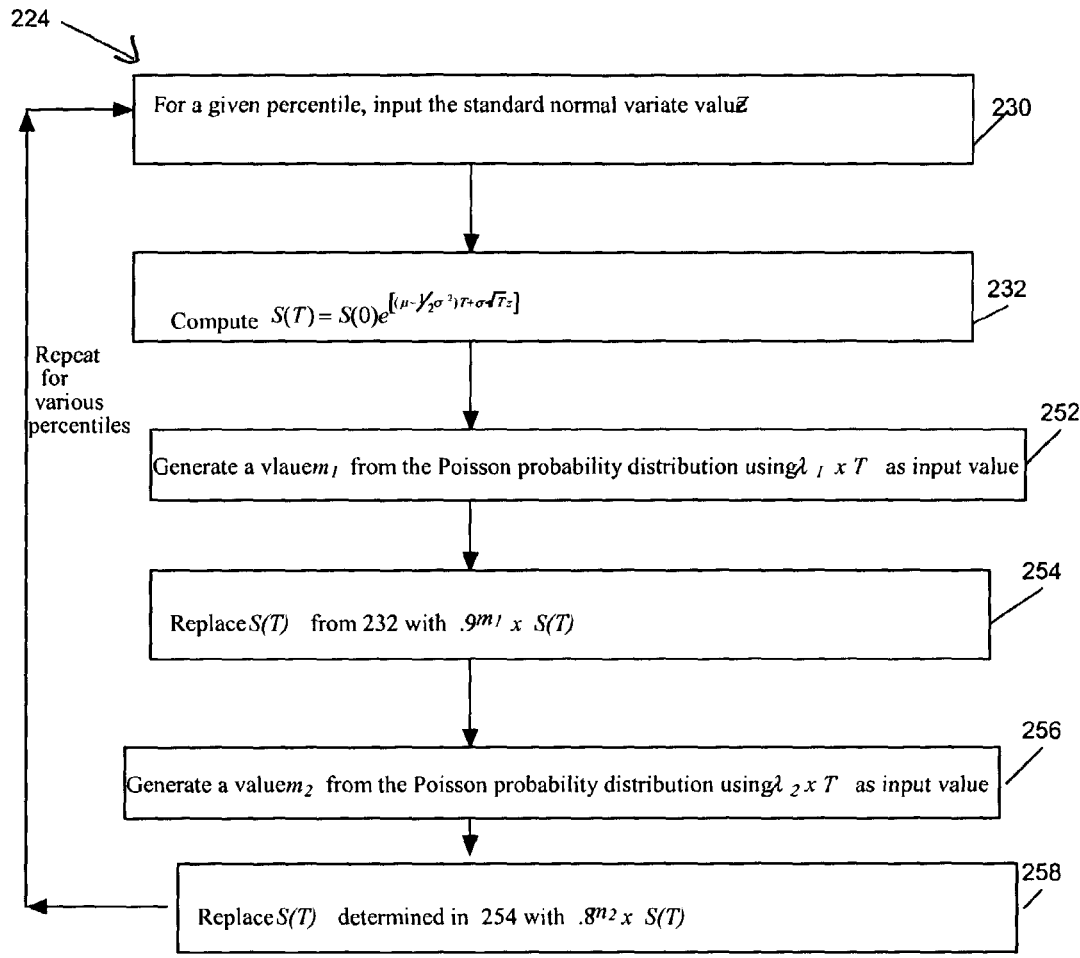
FIG. 7 shows another process of estimating a security's returns as in FIG. 4 in accordance with a preferred embodiment of the invention which takes into account upturns and/or downturns.
Figure 8:
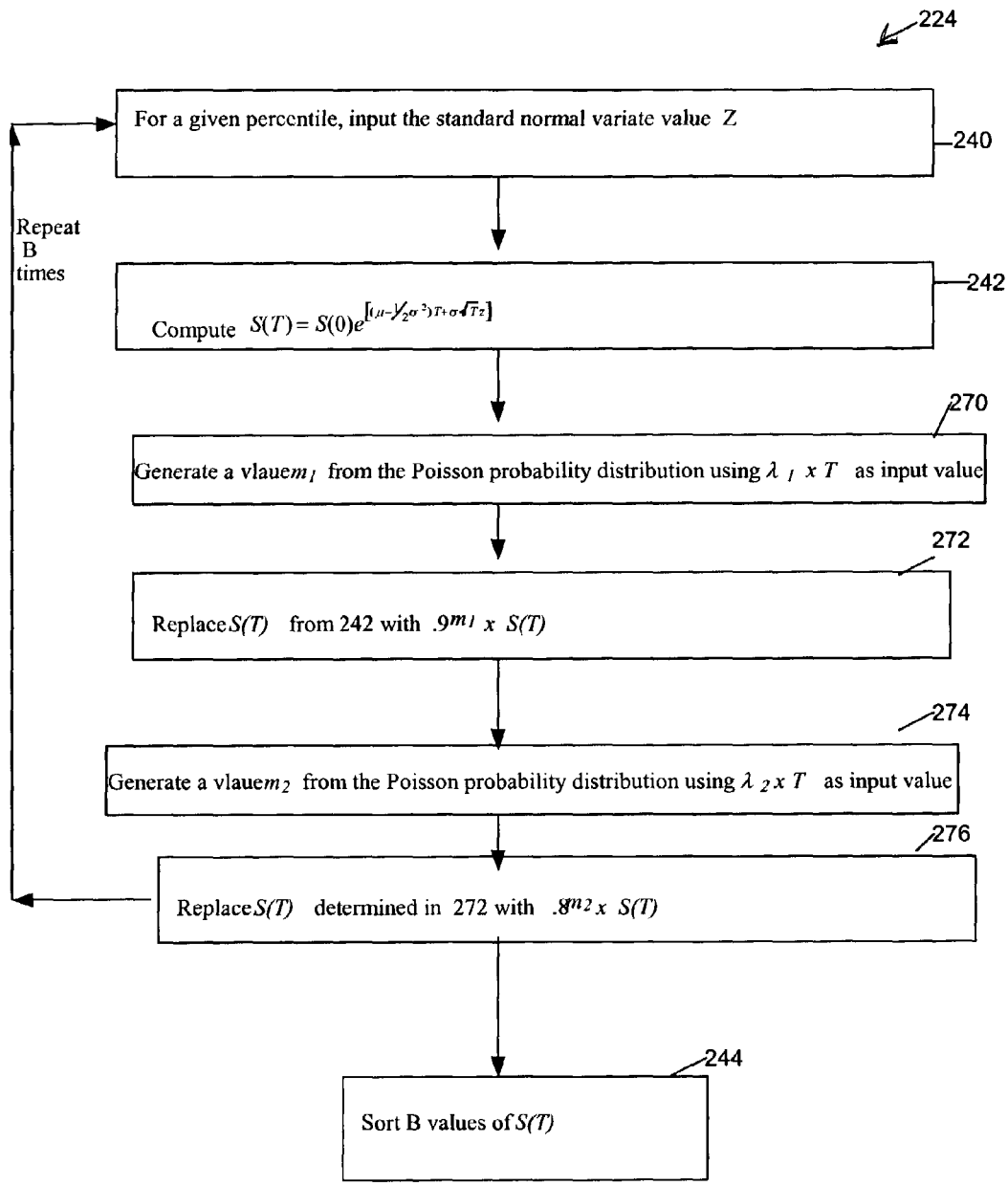
FIG. 8 shows another process of estimating a security's returns as in FIG. 4 in accordance with a preferred embodiment of the invention which takes into account upturns and/or downturns.

As is commonly known, a market (such as the stock market) may suffer general downturns or upturns. These downturns/upturns may appear to occur again and again. The embodiments of FIGS. 5 and 6 may be modified to account for such downturns/upturns. The modifications to the processes of FIGS. 5 and 6 to account for downturns/upturns are shown in FIGS. 7 and 8, respectively. The modifications shown in FIGS. 7 and 8 assume that two types of downward jumps occur periodically. The first type is a 10% downturn that is assumed to occur on average once every year. This assumption is modeled with the variable $\lambda_1$ set equal to a value of 1. The second type is a 20% downturn that is assumed to occur on average of once every five years, which is modeled with the variable $\lambda_2$ set equal to 0.2. Upturns may also be modeled. Further, one or more jumps may be modeled, not just the two jumps modeled in FIGS. 7 and 8.

Referring now to FIG. 7, blocks 230 and 232 are the same as in FIG. 5. Blocks 252-260 generally pertain to modeling the 10% and 20% downturns noted above. The jumps depicted in FIG. 7 are represented using a limiting distribution function. One suitable type of limiting distribution function comprises a Poisson function which may be given by:

$$P_\mu(c) = e^{-\mu}\left[\frac{\mu^c}{c!}\right] \quad (4)$$

where $\mu$ is an input value. The downturns/upturns may also be represented by more gradual drift or other non-jump processes.

In block 252, the Poisson variate c is generated using (4) with input value for $\mu$ being $\lambda_1 \times T$. The resulting value of the Poisson variate c using $\lambda_1$ is represented by $m_1$. In block 254, the value of S(T) computed in 232 is multiplied by $0.9^{m_1}$ and the resulting product replaces the previously calculated value of S(T). In blocks 256 and 258, the newly computed value of S(T) from block 254 is again changed, this time by multiplying S(T) by $0.8^{m_2}$ ($m_2$ represents a generated Poisson variate using $\mu$ value of $\lambda_2 \times T$).

The newly computed S(T) value in 256 may be used in all the following steps in the process. Blocks 230-258 may be performed one or more times for all values of Z to generate a return distribution (e.g., distribution 50).

Referring to FIG. 8, block 224 (from FIG. 4) may be implemented with blocks 240, 242, 270, 272, 274, 276, and 244. Blocks 240, 242 and 244 preferably are the same as discussed above with regard to FIG. 6. Blocks 270-276 adjust the computed value of S(T) from block 242 for the two downward jumps (modeled by $\lambda_1$ and $\lambda_2$). In block 270, a Poisson variate is generated using $\lambda_1 \times T$ as an input value $\mu$ with the resulting Poisson value being represented by $m_1$. In block 272, the value of S(T) computed in 242 is multiplied by $0.9^{m_1}$ and the resulting product replaces the previously calculated value of S(T) from 242. In blocks 274 and 278, the newly computed value of S(T) from block 272 is again changed, this time by multiplying S(T) by $0.8^{m_2}$ ($m_2$ represents a generated Poisson variate using $\lambda_2 \times T$ as input value $\mu$. The newly computed S(T) value in 276 is used in the process from that step forward. Blocks 240-276 may be repeated B times (e.g., 10,000) and the resulting B S(T) samples are sorted in 244 to generate the return distribution for the security.

Figure 9:
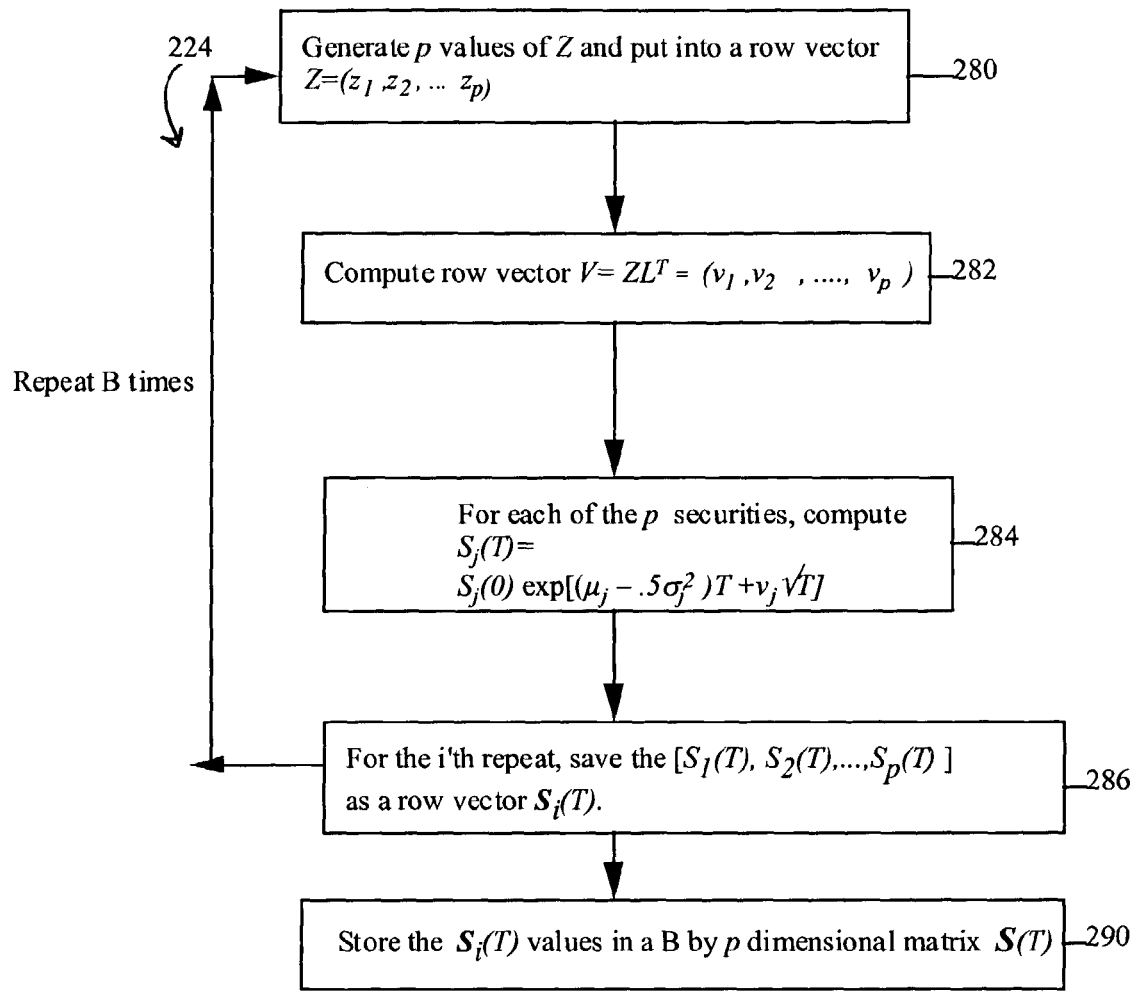
FIG. 9 shows another process of forecasting future returns of multiple securities in accordance with a preferred embodiment of the invention.

As mentioned above, the analysis described to this juncture is related to a portfolio having only a single security. Referring to FIG. 9, another embodiment of block 224 from FIG. 4 is shown in which a portfolio's return distribution is computed for a plurality of securities. The following discussion introduces various quantities that are used in the process of FIG. 9. The number of securities in the portfolio in the example of FIG. 9 is represented by p. As will be explained below, the process of FIG. 9 uses a vector "L" which preferably comprises a Cholesky decomposition of a covariance matrix comprising variance values pertaining to the p securities. The matrix L may be computed in the following way, although other techniques may be possible. It is assumed that the time interval between adjacent times in the historical data are equal and represented by $\Delta t$. For the jth security in the portfolio, the return from time period-to-time period may be represented by $R_{ij}$ as follows (generally, we will take $S_j(t_i)$ to be the price of the jth security at time $t_i$ plus the dividends paid since $t_{i-1}$):

$$R_{ij} = \log\left[\frac{S_j(t_i)}{S_j(t_{i-1})}\right] \quad (5)$$

Accounting for the return rates of the securities, letting $$\overline{R}_j = \frac{1}{N}\sum_{i=1}^{N} R_{i,j}$$

we have $$\hat{\sigma}_{jk} = \frac{1}{(N-1)(\Delta t)}\sum_{i=1}^{N}(R_{i,j} - \overline{R}_j)(R_{i,k} - \overline{R}_k) \quad (6)$$

An estimated variance-covariance matrix then can be generated as follows:

$$\hat{\sum} = \begin{pmatrix} \hat{\sigma}_{11} & \hat{\sigma}_{12} & \cdots & \hat{\sigma}_{1P} \\ \hat{\sigma}_{21} & \hat{\sigma}_{22} & \cdots & \hat{\sigma}_{2P} \\ \cdots & \cdots & \cdots & \cdots \\ \hat{\sigma}_{1P} & \hat{\sigma}_{2P} & \cdots & \hat{\sigma}_{PP} \end{pmatrix} \quad (7)$$

The Cholesky decomposition may be determined from the variance-covariance matrix $\hat{\Sigma}$ as:

$$\hat{\Sigma} = LL^T \quad (8)$$

Further, estimates of $\mu_j$ and $\sigma_j$ are given by $$\hat{\mu}_j = \frac{\overline{R}_j}{\Delta t} + \frac{\hat{\sigma}_j^2}{2}$$

and from (1)

$$\hat{\sigma}_j = \sqrt{\frac{S_{R,j}^2}{\Delta t}} = \sqrt{\hat{\sigma}_{jj}},$$

respectively, for a multi-security portfolio.

The embodiment of FIG. 9 preferably comprises blocks 280-290. In block 280, p values of Z are computed and placed into a row vector designated as $Z=(z_1, z_2, \ldots, z_p)$. In 282, a row vector V is computed by multiplying the row vector Z by the transpose of matrix L. That is $V=ZL^T=(v_1, v_2, \ldots, v_p)$. In block 284, for each of the p securities in the portfolio, a forecast future security value $S_j(T)$ may be computed as:

$$S_j(T) = S_j(0)e^{[(\mu_j - \frac{1}{2}\sigma_j^2)T + v_j\sqrt{T}]} \quad (9)$$

In accordance with block 286, the $S_j(T)$ values of the p stocks are saved as a row vector $S_t(T)$. Blocks 280-286 may be repeated B times (e.g., 10,000) thereby creating B $S_i(T)$ row vectors. The result is a B by p matrix in which each row generally corresponds to a particular value of Z and its associated probability. In block 290, the $S_i(T)$ values preferably are stored in the B by p matrix S(T).

Figure 10:
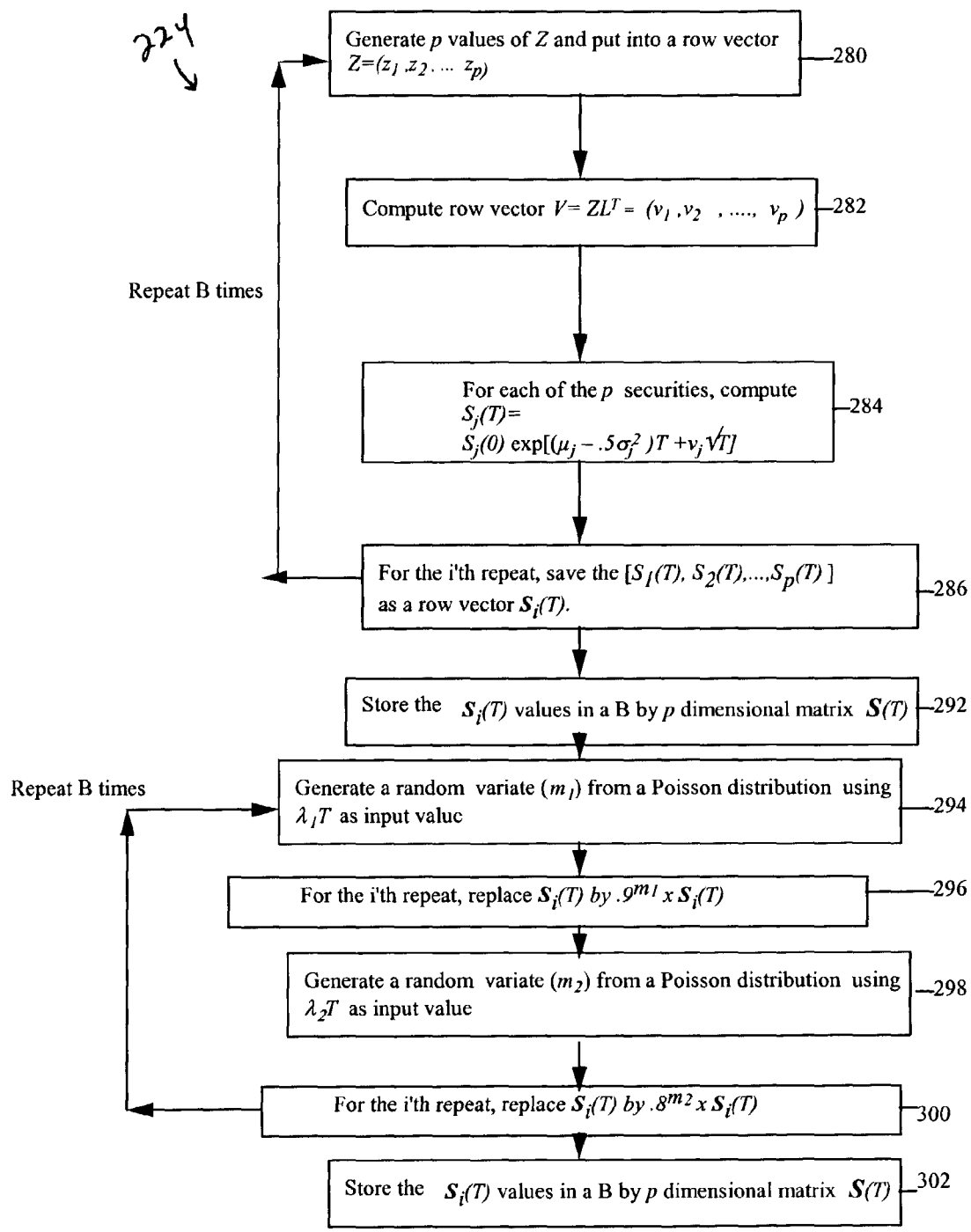
FIG. 10 shows another process of forecasting future returns of multiple securities in accordance with a preferred embodiment of the invention which takes into account upturns and/or downturns.

FIG. 10 shows another embodiment of block 224 of FIG. 4 in which two downward jumps are modeled, as described previously. The process depicted in FIG. 10 includes blocks 280, 282, 284 and 286 as discussed above with regard to FIG. 9. Blocks 280-286 preferably are repeated B times.

In block 292, the $S_{ij}(T)$ values are stored in a B by p dimensional matrix, S(T). In block 294, a computer generated value $(m_1)$ from the Poisson probability distribution is computed using $\lambda_1 \times T$ as an input value. Then, as described previously, the $S_{ij}(T)$ value is replaced by $0.9^{m_1} \times S_{ij}(T)$ (block 296). In blocks 298 and 300, the newly computed $S_{ij}(T)$ value is again replaced by $S_{ij}(T) \times 0.8^{m_2}$ where $m_2$ is a computer generated value from the Poisson distribution computed with an input value of $\lambda_2 \times T$. Blocks 294-300 preferably are repeated B times after which the resulting $S_i(T)$ values are stored in matrix S(T) (block 302).

Figure 11:
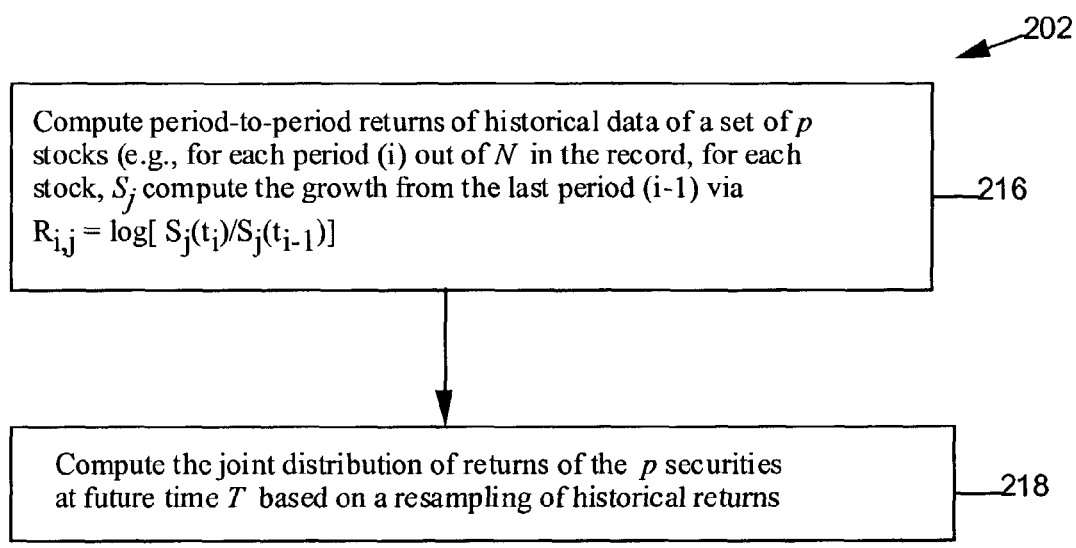
FIG. 11 shows a preferred process for estimating the return distribution based on historical data as shown in FIG. 3 including resampling previous returns of a security or securities.

Referring now to FIG. 11, an alternative process is shown for implementing block 202 in FIG. 3. The process shown in FIG. 11 may not use a model of future returns, as was the case for the processes described above. As shown, the exemplary process of FIG. 11 includes computing period-to-period returns using the historical data (block 216). One exemplary technique for computing such historical returns includes resampling the period-to-period growth (or decline) of each of p stocks (the value $S_j(t_i)$ will include the stock price plus dividends paid since the last time $t_{i-1}$). Such growth is given by:

$$R_{i,j} = \log\left[\frac{S_j(t_i)}{S_j(t_{i-1})}\right] \quad (10)$$

For p stocks considered over N time periods, the $R_{ij}$ values are stored in a N by p matrix R. In bock 218, the distribution of the p securities' return at future time T may be computed based on a sampling of the historical returns computed in 216.

Figure 12:
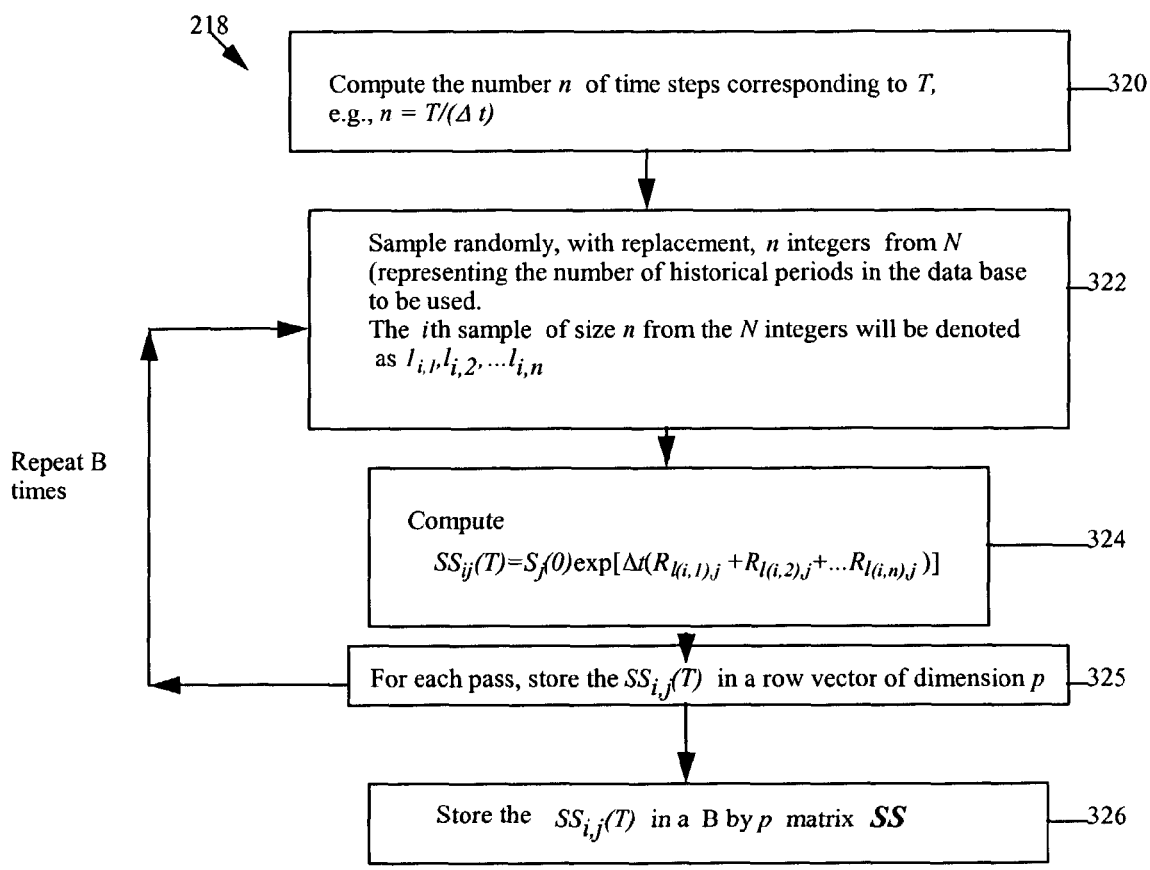
FIG. 12 shows a preferred embodiment for resampling previous returns of a security or securities to determine the return distribution.

FIG. 12 shows an exemplary process usable to perform block 218 in FIG. 11. As shown in FIG. 12, the exemplary block 218 process may comprise blocks 320-326. In block 320, the number of "time steps" n is computed that corresponds to future time T. Blocks 322 through 325 preferably are repeated B times (e.g., 10,000). In block 322, n random values from N are sampled with replacement (i.e., the same value may be sampled more than once). For example, the ith sample of size n from the N integers will be denoted as $l_{i,1}$, $l_{i,2}, \ldots l_{i,n}$ In block 324, future security values are forecast using for $j=1, 2, \ldots, p$ the equation:

$$SS_{ij}(T) = S_j(0)\exp[\Delta t(R_{l_{(i,1)},j} + R_{l_{(i,2)},j} + \ldots + R_{l_{(i,n)},j})] \quad (11)$$

The values $(SS_{i,1}, SS_{i,2}, \ldots S_{i,p})$ preferably are stored as a row vector in block 325. In block 326, the n such row vectors are stored in an n by p matrix SS.

Figure 13:
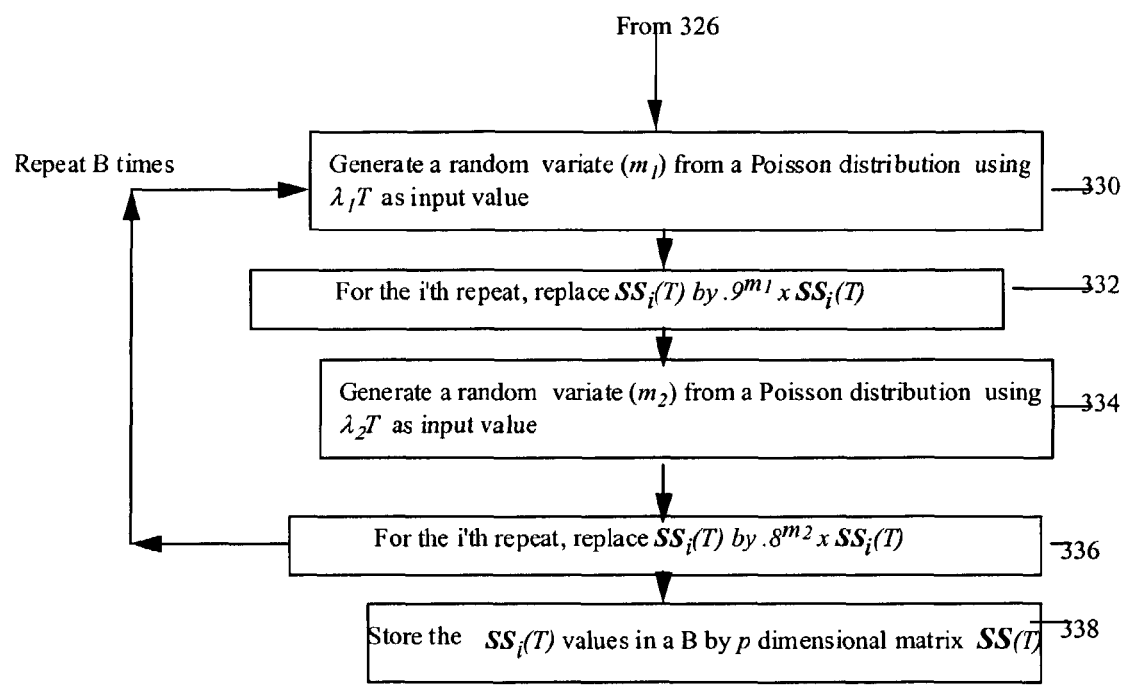
FIG. 13 shows a shows a preferred embodiment for how the process of FIG. 12 may be modified to take into account upturns and/or downturns.

FIG. 13 provides blocks 330-338 which may follow block 326 (FIG. 12) to account for downturns/upturns as discussed above. In blocks 330 and 332, a first value $(m_1)$ of a Poisson distribution is generated based on the first downturn model $(\lambda_1)$ and used to adjust the return values accordingly. Similarly, blocks 334-336, the return values are again adjusted based on the other downturn model $(\lambda_2)$. The n by p matrix of resampled row vectors is then stored in SS (block 338).

There are numerous uses of the portfolio analysis application 130. The following examples are provided merely for illustrative purposes and, in no way, should be used to limit the scope of the disclosure including the claims. Let us suppose we have a portfolio of current value P(0), invested in p stocks with the fraction invested in the jth stock being $c_j$. The $c_j$ satisfy the condition that typically, but not necessarily, they are nonnegative and that for a total investment at time zero of P(0), $$P(0) = \sum_{j=1}^{p} c_j S_j(0) \quad (12)$$

Figure 14:
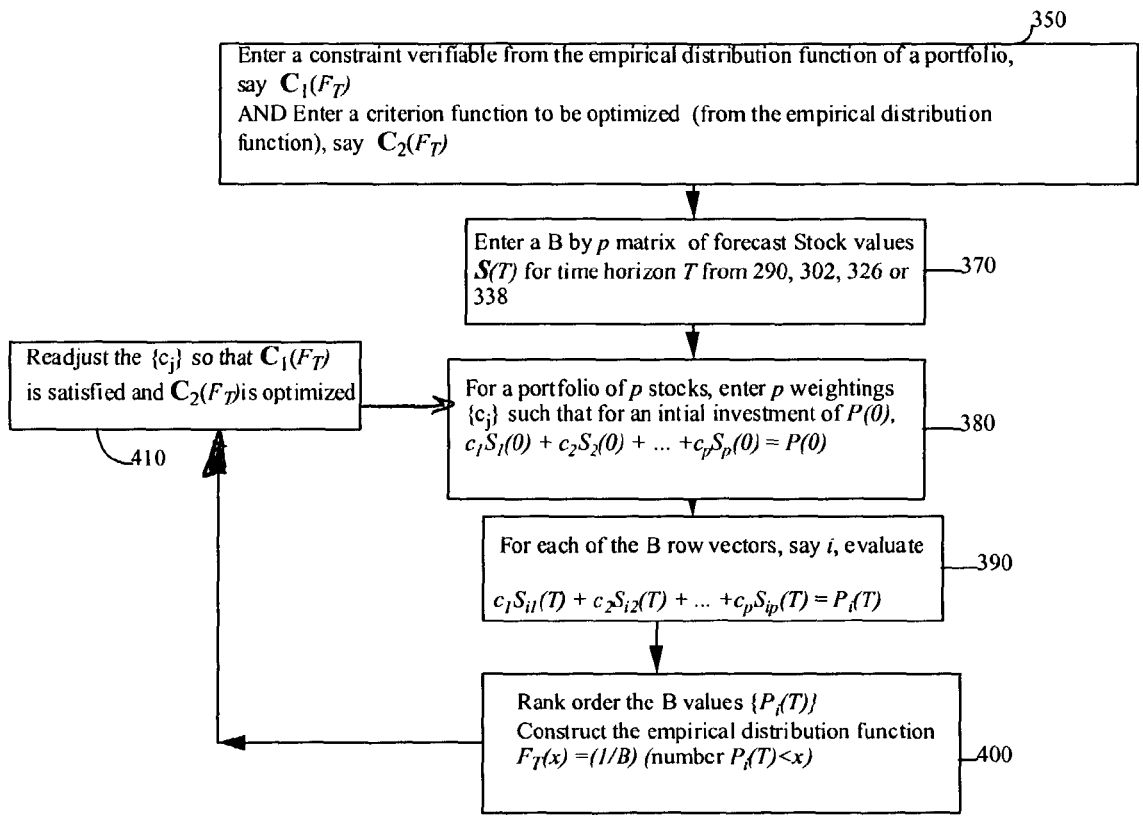
FIG. 14 shows a flow chart usable in an example given below.

Further, at least one time horizon T may be used. Referring to block 350 in FIG. 14, for an empirical distribution function $F_T$ of forecasted values of the portfolio value at time T, it may be desired to modify the weights such that equation (12) is satisfied, and one or several constraints explicitly or implicitly based on $F_T$, say $C_1(F_T)$, and a criterion function explicitly or implicitly based on $F_T$, say $C_2(F_T)$. Then in block 370, a B by p matrix of simulated forecast stock values S(T) may be entered for time horizon T from 290, 302, 326 or 338.

In block 380, the p initial weightings are also entered so that $c_1 S_1(0) + c_2 S_2(0) + \ldots + c_p S_p(0) = P(0)$. For each of the B row vectors, denoted as i, the expression $c_j S_{i1}(T) + c_2 S_{i2}(T) + \ldots + c_p S_{ip}(T) = P_i(T)$ preferably is evaluated (block 390). Next, the B $P_i(T))$ values may be ranked to generate the empirical distribution function in block 390 (via $F_T(x) = (1/B)$ (number $P_i(T) < x$). A constrained optimization procedure (410) is then performed whereby the weights may be changed such that (12) is satisfied as well as the constraint $C_1(F_T)$, and the criterion function $C_2(F_T)$ is optimized. This may be done in an iterative fashion until the change in $C_2(F_T)$ is small (i.e., less than a predetermined threshold). Any one of a variety of techniques of optimization may be utilized. For example, the "polytope" procedure of Nelder and Mead, described in many sources, e.g., *Simulation: A Modeler's Approach* by James R. Thompson_(John Wiley & Sons, 2000), and incorporated herein by reference, may be used. Moreover, it is possible to look at forecast $F_T$ for several future times, or a continuum of future times, and base the constraints on these empirical distribution functions or the empirical distribution functions at other times. For example, one could use the B row vectors of width p from block 292 (or blocks 302 or 326 or 338), to obtain forecasted portfolio value for the ith of B simulations at time T. That is, $$P_i(T) = \sum_{j=1}^{p} c_j S_{ij}(T) \quad (13)$$

These B values of the portfolio then may be sorted to obtain the simugram of the value of the portfolio with these weights. Alternatively, block 326 or 328 may be used to obtain the forecasted portfolio value as:

$$P_i(T) = \sum_{j=1}^{p} c_j SS_{ij}(T) \quad (14)$$

These B values of the portfolio may be sorted to obtain the simugram of the value of the portfolio with these weights. Optimization of the portfolio may be achieved using many different criterion functions and subject to a variety of constraints by readjusting the $c_j$ values (subject to equation (12)).

The following provides additional examples. The numbers included in the examples below are included merely to facilitate understanding the examples. Referring to the example of FIG. 2, the application 130 may be used to determine a portfolio (via readjustment of weights) that maximizes the return computed for the lower 20 percentile. This approach may be desirable for investors that wish to minimize their downside risk.

By way of an additional example, an investor may wish to consider multiple criteria. First, the investor may desire to know the portfolio whose 20-year, lower 20 percentile is at least 4%. Subject to that constraint, the investor also may wish to maximize the 50 percentile (median) return. Further still, the application could be used to help an investor who desires to be 90% sure his or her portfolio will achieve a compounded 5% rate and, subject to that constraint, further desires to maximize the median return. Time is easily varied in the portfolio analysis application 130. This flexibility permits multiple return distributions to be computed for different time periods.

In yet an additional example, 90 components of the Standard & Poors ("S&P") 100 were used that were active from May 1996 through December 2001. The forecast distribution is considered to be 5 years in this example and the maximization criteria is the mean. The minimum risk percentile is 20 and minimum risk return value is 1.15. A maximum allocation of 0.05 for any single component is used. The number of simulations was 10,000 for determination of (par)ametric (alloc)ation and the number of resamples was 10,000 for parametric and nonparametric allocations. The resulting weights that should be applied to the various stocks to maximize the forecasted mean are computed as described above and as shown in Table II below. ("id" is the number of the stock in the portfolio, "permno" is an identifier number for the stock, "ticker" is the symbol for the stock of the company traded on the NYSE, the American Stock Exchange or the NASDAQ.)

TABLE II

| id | permno | ticker | $\hat{\mu}$ | $\hat{\sigma}$ | par alloc | npar alloc |
|---|---|---|---|---|---|---|
| 1 | 10104 | ORCL | 0.44 | 0.65 | 0.05 | 0.05 |
| 2 | 10107 | MSFT | 0.39 | 0.48 | 0.05 | 0.05 |
| 3 | 10145 | HON | 0.12 | 0.44 | 0.00 | 0.00 |
| 4 | 10147 | EMC | 0.48 | 0.61 | 0.05 | 0.05 |
| 5 | 10401 | T | 0.05 | 0.40 | 0.00 | 0.00 |
| 6 | 10890 | UIS | 0.36 | 0.68 | 0.05 | 0.05 |
| 7 | 11308 | KO | 0.07 | 0.31 | 0.00 | 0.00 |
| 8 | 11703 | DD | 0.05 | 0.28 | 0.00 | 0.00 |
| 9 | 11754 | EK | −0.11 | 0.35 | 0.00 | 0.00 |
| 10 | 11850 | XOM | 0.12 | 0.17 | 0.00 | 0.00 |
| 11 | 12052 | GD | 0.19 | 0.25 | 0.00 | 0.00 |
| 12 | 12060 | GE | 0.23 | 0.26 | 0.00 | 0.00 |
| 13 | 12079 | GM | 0.08 | 0.36 | 0.00 | 0.00 |
| 14 | 12490 | IBM | 0.32 | 0.34 | 0.05 | 0.05 |
| 15 | 13100 | MAY | 0.07 | 0.29 | 0.00 | 0.00 |
| 16 | 13856 | PEP | 0.13 | 0.28 | 0.00 | 0.00 |
| 17 | 13901 | MO | 0.13 | 0.32 | 0.00 | 0.00 |
| 18 | 14008 | AMGN | 0.32 | 0.39 | 0.05 | 0.05 |
| 19 | 14277 | SLB | 0.12 | 0.36 | 0.00 | 0.00 |
| 20 | 14322 | S | 0.05 | 0.36 | 0.00 | 0.00 |
| 21 | 15560 | RSH | 0.27 | 0.49 | 0.05 | 0.00 |
| 22 | 15579 | TXN | 0.40 | 0.56 | 0.05 | 0.05 |
| 23 | 16424 | G | 0.09 | 0.33 | 0.00 | 0.00 |
| 24 | 17830 | UTX | 0.21 | 0.35 | 0.00 | 0.00 |
| 25 | 18163 | PG | 0.16 | 0.31 | 0.00 | 0.00 |
| 26 | 18382 | PHA | 0.12 | 0.30 | 0.00 | 0.00 |
| 27 | 18411 | SO | 0.14 | 0.24 | 0.00 | 0.00 |
| 28 | 18729 | CL | 0.25 | 0.33 | 0.00 | 0.05 |
| 29 | 19393 | BMY | 0.20 | 0.26 | 0.00 | 0.00 |
| 30 | 19561 | BA | 0.05 | 0.35 | 0.00 | 0.00 |
| 31 | 20220 | BDK | 0.06 | 0.38 | 0.00 | 0.00 |
| 32 | 20626 | DOW | 0.07 | 0.30 | 0.00 | 0.00 |
| 33 | 21573 | IP | 0.07 | 0.36 | 0.00 | 0.00 |
| 34 | 21776 | EXC | 0.17 | 0.33 | 0.00 | 0.00 |
| 35 | 21936 | PFE | 0.26 | 0.28 | 0.05 | 0.05 |
| 36 | 22111 | JNJ | 0.20 | 0.26 | 0.00 | 0.00 |
| 37 | 22592 | MMM | 0.14 | 0.25 | 0.00 | 0.00 |
| 38 | 22752 | MRK | 0.17 | 0.31 | 0.00 | 0.00 |
| 39 | 22840 | SLE | 0.11 | 0.31 | 0.00 | 0.00 |
| 40 | 23077 | HNZ | 0.06 | 0.25 | 0.00 | 0.00 |
| 41 | 23819 | HAL | −0.03 | 0.47 | 0.00 | 0.00 |
| 42 | 24010 | ETR | 0.11 | 0.29 | 0.00 | 0.00 |
| 43 | 24046 | CCU | 0.27 | 0.38 | 0.02 | 0.05 |
| 44 | 24109 | AEP | 0.04 | 0.22 | 0.00 | 0.00 |
| 45 | 24643 | AA | 0.21 | 0.37 | 0.00 | 0.00 |
| 46 | 24942 | RTN | 0.02 | 0.44 | 0.00 | 0.00 |
| 47 | 25320 | CPB | 0.04 | 0.29 | 0.00 | 0.00 |
| 48 | 26112 | DAL | 0.00 | 0.33 | 0.00 | 0.00 |
| 49 | 26403 | DIS | 0.05 | 0.33 | 0.00 | 0.00 |
| 50 | 27828 | HWP | 0.11 | 0.48 | 0.00 | 0.00 |
| 51 | 27887 | BAX | 0.21 | 0.24 | 0.00 | 0.00 |
| 52 | 27983 | XRX | 0.04 | 0.61 | 0.00 | 0.00 |
| 53 | 38156 | WMB | 0.14 | 0.33 | 0.00 | 0.00 |
| 54 | 38703 | WFC | 0.20 | 0.31 | 0.00 | 0.00 |
| 55 | 39917 | WY | 0.07 | 0.32 | 0.00 | 0.00 |
| 56 | 40125 | CSC | 0.17 | 0.48 | 0.00 | 0.00 |
| 57 | 40416 | AVP | 0.24 | 0.47 | 0.03 | 0.00 |
| 58 | 42024 | BCC | 0.00 | 0.33 | 0.00 | 0.00 |
| 59 | 43123 | ATI | −0.05 | 0.39 | 0.00 | 0.00 |
| 60 | 43449 | MCD | 0.05 | 0.26 | 0.00 | 0.00 |
| 61 | 45356 | TYC | 0.37 | 0.33 | 0.05 | 0.05 |
| 62 | 47896 | JPM | 0.15 | 0.38 | 0.00 | 0.00 |
| 63 | 50227 | BNI | 0.03 | 0.27 | 0.00 | 0.00 |
| 64 | 51377 | NSM | 0.35 | 0.69 | 0.05 | 0.05 |
| 65 | 52919 | MER | 0.31 | 0.44 | 0.05 | 0.05 |
| 66 | 55976 | WMT | 0.32 | 0.31 | 0.05 | 0.05 |
| 67 | 58640 | NT | 0.23 | 0.64 | 0.00 | 0.00 |
| 68 | 59176 | AXP | 0.19 | 0.31 | 0.00 | 0.00 |
| 69 | 59184 | BUD | 0.20 | 0.21 | 0.00 | 0.00 |
| 70 | 59328 | INTC | 0.37 | 0.52 | 0.05 | 0.05 |
| 71 | 59408 | BAC | 0.14 | 0.34 | 0.00 | 0.00 |
| 72 | 60097 | MDT | 0.28 | 0.28 | 0.05 | 0.05 |
| 73 | 60628 | FDX | 0.23 | 0.35 | 0.00 | 0.00 |
| 74 | 61065 | TOY | 0.06 | 0.48 | 0.00 | 0.00 |
| 75 | 64186 | CI | 0.20 | 0.28 | 0.00 | 0.00 |
| 76 | 64282 | LTD | 0.16 | 0.42 | 0.00 | 0.00 |
| 77 | 64311 | NSC | −0.02 | 0.34 | 0.00 | 0.00 |
| 78 | 65138 | ONE | 0.10 | 0.37 | 0.00 | 0.00 |
| 79 | 65875 | VZ | 0.11 | 0.29 | 0.00 | 0.00 |
| 80 | 66093 | SBC | 0.12 | 0.29 | 0.00 | 0.00 |
| 81 | 66157 | USB | 0.12 | 0.37 | 0.00 | 0.00 |
| 82 | 66181 | HD | 0.33 | 0.32 | 0.05 | 0.05 |
| 83 | 66800 | AIG | 0.26 | 0.26 | 0.05 | 0.05 |
| 84 | 69032 | MWD | 0.34 | 0.47 | 0.05 | 0.05 |
| 85 | 70519 | C | 0.35 | 0.36 | 0.05 | 0.05 |
| 86 | 75034 | BHI | 0.11 | 0.41 | 0.00 | 0.00 |
| 87 | 75104 | VIA | 0.21 | 0.37 | 0.00 | 0.00 |
| 88 | 76090 | HET | 0.09 | 0.39 | 0.00 | 0.00 |
| 89 | 82775 | HIG | 0.24 | 0.37 | 0.00 | 0.00 |
| 90 | 83332 | LU | 0.10 | 0.54 | 0.00 | 0.00 |

By producing a distribution of returns for a portfolio, growth and risk can be integrated in a manner easily understandable by a lay investor. The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An electronic system comprising:
   a computer processor;
   memory coupled to said processor; and
   software stored on said memory and executed by said processor, said software causing said processor to:
   (a) retrieve historical market data, wherein said market data represents a plurality of p investment securities with an associated set of historical price data for a plurality of 1, 2, . . . N time periods, where N is an integer;
   (b) determine a price ratio matrix, wherein said price ratio matrix includes a plurality of ratio elements for each of the p investment securities and each ratio element is a quotient based on the historical market price data, wherein said quotient is the historical price data for a selected time period divided by the historical price data for a prior time period, and wherein said quotient represents a growth or decline factor for each of the plurality of investment securities;
   (c) calculate from the price ratio matrix, a simulation matrix for the plurality of investment securities M time units into the future, said simulation matrix based on resampling with replacement the ratio elements for the 1, 2, . . . N time periods from the price ratio matrix, wherein said simulation matrix includes a plurality of simulation elements, each simulation element is a product of M resampled with replacement ratio elements for each of the p investment securities;
   (d) repeat said calculate step a plurality of times to produce a multivariate simulation distribution of the concatenated ratios in synchrony for each of the p investment securities;
   (e) determine a set of optimized weights from the simulation distribution, wherein each weight of the set of weights is such that all weights sum to one and are optimized subject to a plurality of constraints and an optimization function, and wherein a set of non-optimized initial weights are provided; and
   (f) determine the optimized weights based on the non-optimized initial weights from which an optimized investment portfolio is determined for the plurality of p investment securities.

2. The system of claim 1, wherein the computer processor further determines a return distribution for presenting the distribution on a display.

3. The system of claim 1, wherein the computer processor further evaluates the resampling with replacement procedure in order to forecast a vector of simulated future returns using a collection of random variables.

4. The system of claim 3, wherein the computer processor evaluates an optimal allocation of resources to the p investment securities according to a maximization of a percentile or sum of percentiles of an empirical histogram of the simulated future returns subject to constraints on the resulting simulated histogram, providing a Nonparametric Simugram.

5. The system of claim 3, wherein the simulated future returns are modified by the computer processor with additions of upturns and downturns from a Poisson process.

6. The system of claim 5, wherein the computer processor determines an optimal allocation of resources to the p investment options according to a maximization of a percentile or a weighted sum of percentiles of an empirical histogram of the simulated future returns of the resampled forecasts subject to constraints on the resulting simulated histogram, providing a Nonparametric Simugram with Poisson Contamination.

7. The system of claim 1, wherein an estimation by the computer processor of parameter values is determined, based on the ratio elements of the p investment securities characterizing a multivariate Gaussian process using the historical data of the p investment securities.

8. The system of claim 7, wherein a plurality of simulated future vector values by a multivariate Gaussian process of the p investment securities are computed by the computer processor, wherein said computing uses estimated parameter values, thereby providing a parametric Gaussian Simugram.

9. The system of claim 8, wherein an allocation of investment securities is optimized by the computer processor to produce a maximum value of simulation percentiles or sum of percentiles which forecasts a vector of future returns using a collection of weighted securities subject to constraints on the percentiles of a portfolio specified by these weights from the parametric Gaussian Simugram.

10. The system of claim 9, wherein the vector of future returns is modified by the computer processor by an addition of upturns and downturns from one or more Poisson processes.

11. The system of claim 10, wherein an allocation of investment securities is optimized by the computer processor to produce a maximum value of simulation percentiles or sum of percentiles which forecasts a vector of future returns using a collection of weighted securities subject to constraints on percentiles of a portfolio specified by these weights from the parametric Gaussian Simugram contaminated by a Poisson process.

12. A method of optimizing an investment portfolio, comprising:
   (a) receiving, by a computer system, historical market data, wherein said market data represents a plurality of p investment securities with an associated set of historical price data for a plurality of 1, 2, . . . N time periods, where N is an integer;
   (b) determining, by the computer system, a price ratio matrix, wherein said price ratio matrix includes a plurality of ratio elements for each of the p investment securities and each ratio element is a quotient based on the historical market price data, wherein said quotient is the historical price data for a selected time period divided by the historical price data for a prior time period, and wherein said quotient represents a growth or decline factor for each of the plurality of investment securities;
   (c) calculating, by the computer processor, a simulation matrix for the plurality of investment securities M time units into the future, said simulation matrix based on resampling with replacement the ratio elements for the 1,2 . . . N time periods from the price ratio matrix, wherein said simulation matrix includes a plurality of simulation elements, each simulation element is a product of M resampled with replacement ratio elements for each of the p investment securities;
   (d) repeating said calculating step a plurality of times to produce a multivariate simulation distribution of concatenated ratios in synchrony for each of the p investment securities;
   (e) determining, by the computer processor, a set of optimized weights from the simulation distribution, wherein each weight of the set of weights sum to one and are optimized subject to a plurality of constraints and an optimization function, and wherein a set of non-optimized initial weights are provided; and
   (f) determining, by the computer processor, the optimized weights based on the non-optimized initial weights from which an optimized investment portfolio is determined for the plurality of investment securities.

13. The method of claim 12, further determining by the computer processor a return distribution and presenting it on a display.

14. The method of claim 12, wherein further evaluating by the computer processor the resampling with replacement procedure in order to forecast a vector of simulated future returns using a collection of random variables.

15. The method of claim 14, wherein further evaluating by the computer processor an optimal allocation of the p investment securities according to a maximization of a percentile or sum of percentiles of an empirical histogram of the simulated future returns subject to constraints on a resulting simulated histogram, providing a Nonparametric Simugram.

16. The method of claim 14, wherein the simulated future returns are modified by the computer processor by an addition of upturns and downturns from a Poisson process.

17. The method of claim 16, wherein the computer processor determines an optimal allocation of resources to the p investment securities according to a maximization of a percentile or a weighted sum of percentiles of an empirical histogram of the simulated future returns of resampled forecasts subject to constraints on a resulting simulated histogram, providing a Nonparametric Simugram with Poisson Contamination.

18. The method of claim 12, wherein an estimation by the computer processor of parameter values is determined, based on the ratio elements of the p investment securities characterizing a multivariate Gaussian process using the historical data of the p investment securities.

19. The method of claim 18, wherein a plurality of simulated future vector values by a multivariate Gaussian process of the p investment securities are computed by the computer processor, wherein said computing uses estimated parameter values, thereby providing a parametric multivariate Gaussian Simugram.

20. The method of claim 19, wherein an allocation of investment securities is optimized by the computer processor to produce a maximum value of simulation percentiles or sum of percentiles which forecasts a vector of future returns using a collection of weighted securities subject to constraints on the percentiles of a portfolio specified by these weights from the parametric multivariate Gaussian Simugram.

21. The method of claim 20, wherein the future vector of values is modified by the computer processor by an addition of upturns and downturns from one or more Poisson processes.

22. The method of claim 21, wherein an allocation of investment securities is optimized by the computer processor to produce a maximum value of simulation percentiles or sum of percentiles which forecasts a vector of future returns using a collection of weighted securities subject to constraints on percentiles of a portfolio specified by these weights from the parametric Gaussian Simugram contaminated by a Poisson process.

23. A computer readable non-transitory storage medium product storing executable instructions that when executed by a computer cause the computer to optimize an investment portfolio, said instructions comprising:

(a) instructions that receive from memory historical market data, wherein said market data represents a plurality of p investment securities with an associated set of historical price data for a plurality of 1, 2, ... N time periods, where N is an integer;

(b) instructions that determine a price ratio matrix, wherein said price ratio matrix includes a plurality of ratio elements for each of the p investment securities and each ratio element is a quotient based on the historical market price data, wherein said quotient is the historical price data for a selected time period divided by the historical price data for a prior time period, and wherein said quotient represents a growth or decline factor for each of the plurality of investment securities;

(c) instructions that calculate from the price ratio matrix, a simulation matrix for the plurality of investment options M time units into the future, said simulation matrix based on resampling with replacement the ratio elements for the 1, 2, ... N time periods form the price ratio matrix, wherein said simulation matrix includes a plurality of simulation elements, each simulation element is a product of M resampled with replacement ratio elements for each of the p investment securities;

(d) instructions that repeat said calculate step a plurality of times to produce a multivariate simulation distribution of concatenated ratios in synchrony for each of the p investment securities;

(e) instructions that determine a set of optimized weights from the simulation distribution, wherein each weight of the set of weights sum to one and are optimized subject to a plurality of constraints and an optimization function, and wherein a set of non-optimized initial weights are provided; and (f) instructions that determine the optimized weights based on the non-optimized initial weights from which an optimized investment portfolio is determined for the plurality of p investment securities.

24. The computer program product of claim 23, further including instructions that determine and show an estimated return distribution on a display.

25. The computer program product of claim 23, further comprising instructions that provide for further evaluation of the resampling with replacement procedure in order to forecast a vector of simulated future returns using a collection of random variables.

26. The computer program product of claim 25, further comprising instructions that provide for evaluating an optimal allocation of the p investment securities according to a maximization of a percentile or sum of percentiles of an empirical histogram of the simulated future returns forecasts subject to constraints on a resulting simulated histogram, providing a Nonparametric Simugram.

27. The computer program product of claim 25, further including instructions that provide modifying simulated future returns by an addition of upturns and downturns from a Poisson process.

28. The computer program product of claim 27, further comprising instructions that determine an optimal allocation of resources to the p investment securities according to a maximization of a percentile or a weighted sum of percentiles of an empirical histogram of the simulated future returns of resampled forecasts subject to constraints on a resulting simulated histogram, providing a Nonparametric Simugram with Poisson Contamination.

29. The computer program product of claim 23, further comprising instructions that determine an estimation of parameter values, based on the ratio elements of the p investment securities characterizing a multivariate Gaussian process using the historical data of the p investment securities.

30. The computer program product of claim 29, further comprising instructions that determine a plurality of simulated future vector values by a multivariate Gaussian process of the p investment securities, wherein said determine uses estimated parameter values giving a parametric Gaussian Simugram.

31. The computer program product of claim 30, further comprising instructions for optimizing an allocation of investment securities on the processor to produce a maximum value of a simulation percentile or a weighted sum of percentiles which forecasts a vector of future returns using a collection of weighted securities subject to constraints on the percentiles of a portfolio specified by these weights from the parametric Gaussian Simugram.

32. The computer program product of claim 31, further comprising instructions that modify the vector of future returns by the processor by an addition of upturns and downturns from one or more Poisson processes.

33. The computer program product of claim 32, further comprising instructions that optimize an allocation of investment securities to produce a maximum value of a simulation percentile or a weighted sum of percentiles which forecasts a vector of future returns using a collection of weighted securities subject to constraints on percentiles of a portfolio specified by these weights from the parametric Gaussian Simugram contaminated by a Poisson process.

* * * * *